(12) United States Patent
Torres et al.

(10) Patent No.: US 9,460,738 B1
(45) Date of Patent: Oct. 4, 2016

(54) METHOD TO COAT NFT AREA WITH HIGHLY THERMAL CONDUCTING MATERIAL IN HAMR STRUCTURE

(71) Applicant: HGST Netherlands B.V., Amsterdam (NL)

(72) Inventors: Eduardo Torres, San Jose, CA (US); Cherngye Hwang, San Jose, CA (US); Randy Simmons, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/798,428

(22) Filed: Jul. 13, 2015

(51) Int. Cl.
G11B 5/40 (2006.01)
G11B 5/31 (2006.01)
G11B 5/00 (2006.01)

(52) U.S. Cl.
CPC ............... *G11B 5/40* (2013.01); *G11B 5/314* (2013.01); *G11B 5/3163* (2013.01); *G11B 2005/0021* (2013.01)

(58) Field of Classification Search
None
See application file for complete search history.

(56) References Cited

U.S. PATENT DOCUMENTS

| 5,897,984 | A | 4/1999 | Kubota et al. | |
|---|---|---|---|---|
| 8,491,802 | B1* | 7/2013 | Gao | G11B 5/3133 216/24 |
| 8,619,512 | B1* | 12/2013 | Yuan | G11B 5/3136 369/13.33 |
| 8,721,902 | B1* | 5/2014 | Wang | G11B 5/314 216/22 |
| 8,810,947 | B1 | 8/2014 | Ren et al. | |
| 8,824,247 | B2 | 9/2014 | Hurley et al. | |
| 8,861,317 | B1 | 10/2014 | Yan et al. | |
| 8,902,720 | B1 | 12/2014 | Schreck et al. | |
| 8,908,482 | B1* | 12/2014 | Balamane | G11B 5/314 369/13.33 |
| 2010/0214685 | A1* | 8/2010 | Seigler | G11B 5/02 360/59 |
| 2011/0205864 | A1* | 8/2011 | Huang | G02B 6/102 369/13.33 |
| 2013/0286806 | A1* | 10/2013 | Wessel | G11B 13/08 369/13.33 |
| 2014/0177405 | A1* | 6/2014 | Rejda | G11B 5/102 369/13.02 |
| 2014/0254336 | A1* | 9/2014 | Jandric | G02B 6/1226 369/13.33 |
| 2015/0030887 | A1 | 1/2015 | Brand | |
| 2015/0248905 | A1* | 9/2015 | Cheng | G11B 5/4866 369/13.33 |

FOREIGN PATENT DOCUMENTS

| WO | 2013/163195 A1 | 10/2013 |
|---|---|---|
| WO | 2014/197190 A1 | 12/2014 |

OTHER PUBLICATIONS

LaBrake, et al.; Solid State Technology; HDD Patterned Media Using Jet-and-Flash Imprint Lithography; downloaded Feb. 24, 2015; 7 total pages.

* cited by examiner

*Primary Examiner* — Peter Vincent Agustin
(74) *Attorney, Agent, or Firm* — Patterson & Sheridan, LLP

(57) ABSTRACT

Embodiments disclosed herein generally relate to a method for forming a HAMR head. The method includes depositing a drop-on-demand mask on a portion of a surface of a slider using a drop-on-demand tool. The surface of the slider includes at least a portion of an NFT. A first protective layer is deposited over a remaining portion of the surface of the slider and over the drop-on-demand mask. The drop-on-demand mask and a portion of the first protective layer disposed on the drop-on-demand mask are removed, exposing at least the portion of the NFT. A second protective layer is deposited on the first protective layer and at least the exposed portion of the NFT. By using the drop-on-demand tool to deposit the drop-on-demand mask, the alignment between the drop-on-demand mask and the portion of the NFT is less stringent, and the drop-on-demand mask can be easily removed using a wiping tool.

9 Claims, 4 Drawing Sheets

METHOD TO COAT NFT AREA WITH HIGHLY THERMAL CONDUCTING MATERIAL IN HAMR STRUCTURE

BACKGROUND

1. Field

Embodiments disclosed herein generally relate to a magnetic disk device employing a heat assisted magnetic recording (HAMR) head.

2. Description of the Related Art

Higher storage bit densities in magnetic media used in disk drives have reduced the size (volume) of magnetic bits to the point where the magnetic bit dimensions are limited by the grain size of the magnetic material. Although grain size can be reduced further, the data stored within the magnetic bits may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" once the media cools to ambient temperatures. This technique is broadly referred to as HAMR, which can be applied to longitudinal and perpendicular recording systems as well as "bit patterned media". Heating of the media surface has been accomplished by a number of techniques such as focused laser beams or near-field optical sources.

Typically, external optoelectronic devices such as lasers or photodiodes are integrated into a finished slider through optical coupling to various waveguides that then guide and focus the light onto a plasmonic near field transducer (NFT) used to generate the heat spot. A protective overcoat made of amorphous diamond-like carbon (DLC) is typically formed on the slider facing the magnetic media. Degradation or oxidation of the protective overcoat, along with back-heating of the NFT as a result of slider-media frictional heating, can reduce the reliability of the NFT.

Therefore, an improved method for forming a HAMR head is needed.

SUMMARY

Embodiments disclosed herein generally relate to a method for forming a HAMR head. The method includes depositing a drop-on-demand mask on a portion of a surface of a slider using a drop-on-demand tool. The surface of the slider includes at least a portion of an NFT. A first protective layer is deposited over a remaining portion of the surface of the slider and over the drop-on-demand mask. The drop-on-demand mask and a portion of the first protective layer disposed on the drop-on-demand mask are removed, exposing at least the portion of the NFT. A second protective layer is deposited on the first protective layer and at least the exposed portion of the NFT. By using the drop-on-demand tool to deposit the drop-on-demand mask, the alignment between the drop-on-demand mask and the portion of the NFT is less stringent, and the drop-on-demand mask can be easily removed using a wiping tool.

In one embodiment, a method includes disposing a drop-on-demand mask on at least a portion of an NFT, depositing a first protective layer over a remaining portion of the NFT and over the drop-on-demand mask, removing the drop-on-demand mask and a portion of the first protective layer disposed over the drop-on-demand mask, the portion of the NFT is exposed, and depositing a second protective layer on the exposed portion of the NFT.

In another embodiment, a method includes disposing a mask on at least a portion of an NFT, and the mask includes ink. The method further includes depositing a diamond like carbon layer over a remaining portion of the NFT and over the mask, removing the mask and a portion of the diamond like carbon layer disposed over the mask, the portion of the NFT is exposed, and depositing an aluminum nitride layer on the exposed portion of the NFT.

In another embodiment, a magnetic head includes an NFT, a main pole end, and an overcoat formed on the NFT and the main pole end. The overcoat includes a first portion and a second portion distinct from the first portion, and the second portion of the overcoat is disposed adjacent to at least a portion of the NFT. The second portion of the overcoat is formed on the portion of the NFT after an ink mask is removed from the portion of the NFT.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to specific described embodiments. Instead, any combination of the following features and elements, whether related to different embodiments or not, is contemplated to implement and practice the claimed subject matter. Furthermore, although embodiments described herein may achieve advantages over other possible solutions and/or over the prior art, whether or not a particular advantage is achieved by a given embodiment is not limiting of the claimed subject matter. Thus, the following aspects, features, embodiments and advantages are merely illustrative and are not considered elements or limitations of the appended claims except where explicitly recited in a claim(s).

Embodiments disclosed herein generally relate to a method for forming a HAMR head. The method includes depositing a drop-on-demand mask on a portion of a surface of a slider using a drop-on-demand tool. The surface of the slider includes at least a portion of an NFT. A first protective layer is deposited over a remaining portion of the surface of the slider and over the drop-on-demand mask. The drop-on-demand mask and a portion of the first protective layer disposed on the drop-on-demand mask are removed, exposing at least the portion of the NFT. A second protective layer is deposited on the first protective layer and at least the exposed portion of the NFT. By using the drop-on-demand tool to deposit the drop-on-demand mask, the alignment between the drop-on-demand mask and the portion of the NFT is less stringent, and the drop-on-demand mask can be easily removed using a wiping tool.

Figure 1:
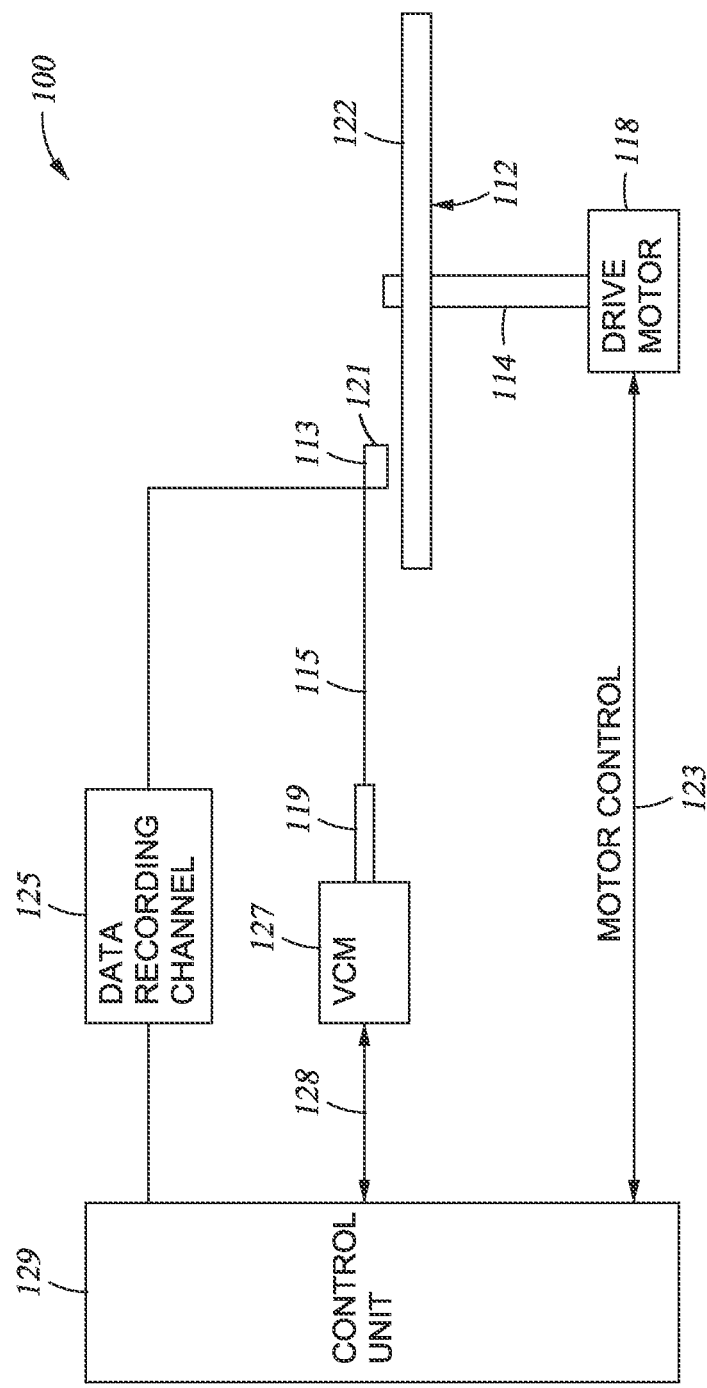
FIG. 1 illustrates a disk drive system according to embodiments described herein.

FIG. 1 illustrates a disk drive 100 embodying this disclosure. As shown, at least one rotatable magnetic media 112 is supported on a spindle 114 and rotated by a disk drive motor 118. The magnetic recording on each media is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121 that may include a radiation source (e.g., a laser or LED) for heating the media surface 122. As the magnetic media 112 rotates, the slider 113 moves radially in and out over the media surface 122 so that the magnetic head assembly 121 may access different tracks of the magnetic media 112 to read or record data. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of a HAMR enabled disk drive 100, the rotation of the magnetic media 112 generates an air bearing between the slider 113 and the media surface 122 which exerts an upward force or lift on the slider 113. The air bearing thus counter-balances the slight spring force of suspension 115 and supports slider 113 slightly above the media 112 surface by a small, substantially constant spacing during normal operation. The radiation source heats up the high-coercivity media so that the write elements of the magnetic head assembly 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of media and actuators, and each actuator may support a number of sliders.

Figure 2:
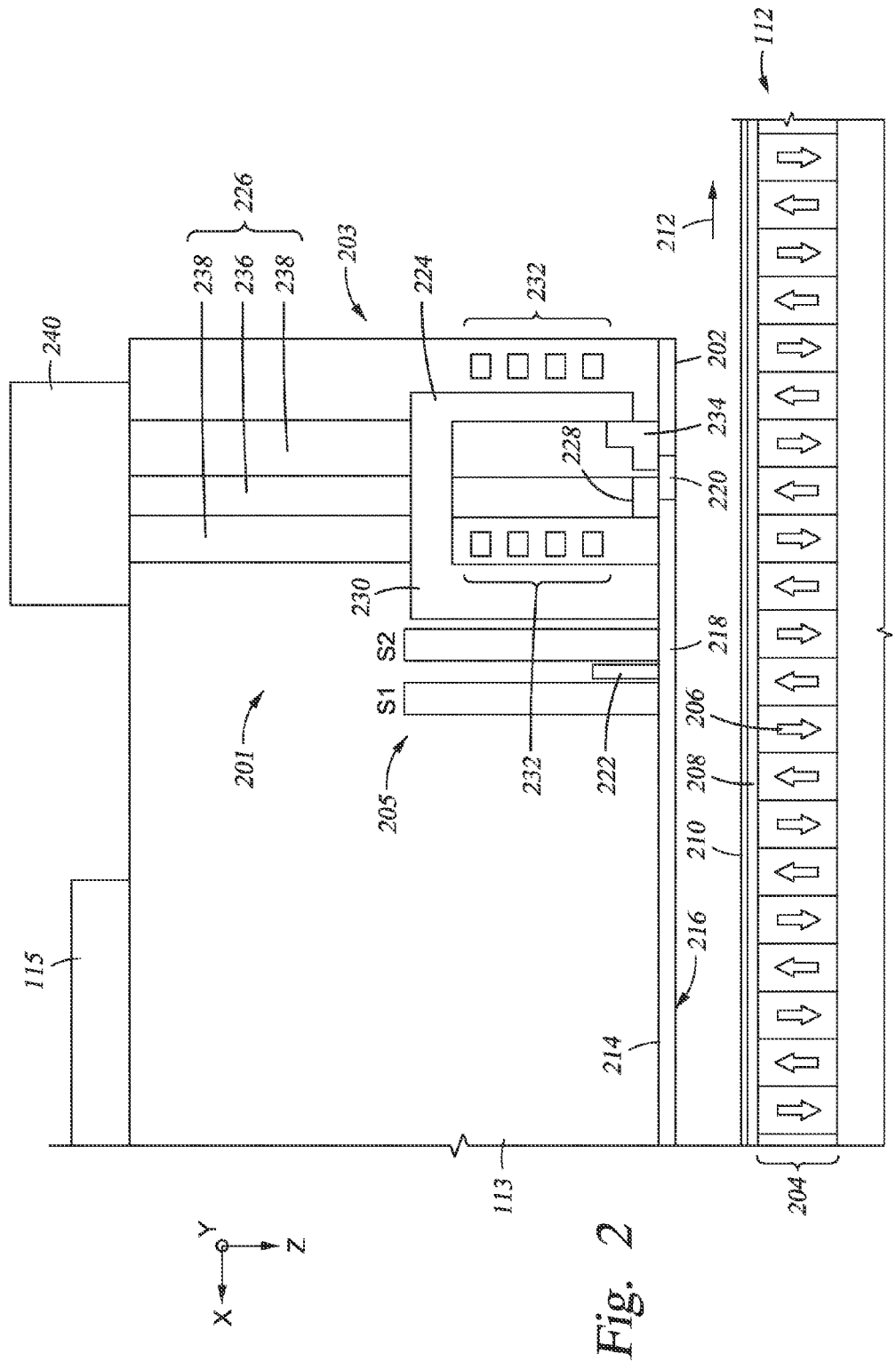
FIG. 2 is a fragmented, cross sectional side view of a HAMR read/write head and magnetic media of the disk drive of FIG. 1 according to one embodiment described herein.

FIG. 2 is a cross sectional side view of a HAMR read/write head 201 and magnetic media 112 of the disk drive 100 of FIG. 1. The read/write head 201 may correspond to the magnetic head assembly 121 described in FIG. 1. The read/write head 201 includes a media facing surface (MFS) 202, such as an air bearing surface (ABS), a write head 203 and a magnetic read head 205, and is mounted on the slider 113 such that the MFS 202 is facing the magnetic media 112. The magnetic media 112 may include a recording layer 204 having magnetized regions or "bits" 206. The magnetic media 112 may also include an overcoat 208, typically formed of amorphous DLC, and a lubricant layer 210, typically formed of perfluoropolyether (PFPE). As shown in FIG. 2, the magnetic media 112 moves past the write head 203 in the direction indicated by the arrow 212. The slider 113 and the HAMR read/write head 201 may include a surface 214 facing the magnetic media 112, and an overcoat 216 may be formed on the surface 214. The overcoat 216 may have a thickness ranging from about 1 nm to about 3 nm, and the overcoat 216 includes the MFS 202. The overcoat 216 may include a first portion 218 and a second portion 220. The first portion 218 may be made of DLC and the second portion 220 may be made of aluminum nitride (AlN).

In some embodiments, the magnetic read head 205 is a magnetoresistive (MR) read head that includes an MR sensing element 222 located between MR shields S1 and S2. In other embodiments, the magnetic read head 205 is a magnetic tunnel junction (MTJ) read head that includes a MTJ sensing element 222 located between MR shields S1 and S2. The magnetic fields of the adjacent magnetized regions in the magnetic media 112 are detectable by the MR (or MTJ) sensing element 222 as the recorded bits.

The write head 203 includes a main pole 224, a waveguide 226, a NFT 228, a main pole end 234, a return pole 230, and a coil 232 that excites the main pole 224. The waveguide 226 may include a core 236 and cladding material 238 surrounding the core 236. The write head 203 may be operatively attached to a laser 240 (i.e., a radiation source). The laser 240 may be placed directly on the write head 203 or radiation may be delivered from the laser 240 located separate from the slider 113 through an optical fiber or waveguide. The waveguide 226 is a channel that transmits the radiation through the height of the write head 203 to the NFT 228—e.g., a plasmonic device or optical transducer—which is located near the MFS 202. The NFT 228 typically uses a low-loss metal (e.g., Au, Ag, Al or Cu) shaped in such a way to concentrate surface charge motion at a tip located at the MFS 202 when light from the waveguide 226 is incident. Oscillating tip charge creates an intense near-field pattern, heating the recording layer 204. Sometimes, the metal structure of the NFT 228 can create resonant charge motion (surface plasmon) to further increase intensity and heating of the recording layer 204. At the moment of recording, the recording layer 204 of the magnetic media 112 is heated by the optical near-field generated by the NFT 228 and, at the same time, a region or "bit" 206 is magnetized and thus written onto the recording layer 204 by applying a recording magnetic field generated by the main pole end 234.

In a HAMR disk drive, the charge motion in the NFT 228 also causes heating of the NFT 228, and this "self-heating" can reduce the long-term reliability of the NFT 228, either by causing rounding of the NFT 228 tip or by degrading and oxidizing the conventional DLC overcoat. The effect of this "self-heating" can be minimized by replacing a portion of the DLC overcoat with an optically transparent material, such as AlN. Thus, the overcoat 216 includes the first portion 218 and the second portion 220 distinct from the first portion 218, and the second portion 220 may be made of AlN and may be located adjacent the portion of the NFT 228 where the optical near-field is generated. The first portion 218 may be located adjacent the remaining portion of the HAMR read/write head 201 not adjacent to the second portion 220. The remaining portion of the HAMR read/write head 201 may include, inter alia, the remaining portion of the NFT 228, at least a portion of the main pole end 234, and the MR sensing element 222.

Figure 3A:
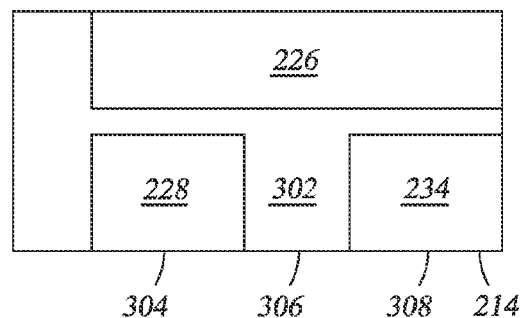
FIGS. 3A-3F illustrate a process for forming an overcoat according to various embodiments described herein.

FIGS. 3A-3F illustrate a process for forming the overcoat 216 according to various embodiments described herein. FIG. 3A is an enlarged view of the NFT 228, the main pole end 234 and the waveguide 226. A spacer layer 302 may be disposed between the NFT 228 and the main pole end 234. The spacer layer 302 may be made of a dielectric material, such as alumina. The NFT 228 may include a surface 304 facing the magnetic media 112, the spacer layer 302 may include a surface 306 facing the magnetic media 112, and the main pole end 234 may include a surface 308 facing the magnetic media 112. The surfaces 304, 306, 308 may be portions of the surface 214 shown in FIG. 2.

Figure 3B:
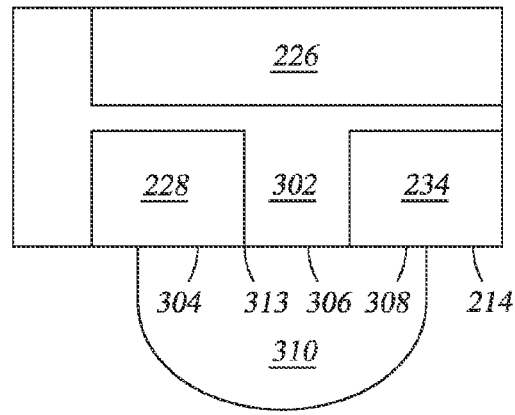

As shown in FIG. 3B, a drop-on-demand mask 310 is formed on a portion of the surface 214 that may be at least a portion of the surface 304, the surface 306, and at least a portion of the surface 308. The drop-on-demand mask 310 may be made of a liquid material, such as ink. In one embodiment, the drop-on-demand mask 310 is made of black ink. The drop-on-demand mask 310 may be deposited on a portion of the surface 214 using a drop-on-demand tool, such as an inkjet printer or a medical drug dispensing unit. The benefit of using such drop-on-demand tool is that the size of the drop-on-demand mask 310 may be easily varied, and the cost of forming a mask on a portion of the surface 214 is reduced compared to using photolithography processes. In addition, the liquid drop-on-demand mask 310 may be easily removed compared to using an etch process, which may damage the NFT 228. The drop-on-demand mask 310 may have a diameter ranging from about 1 micron to about 2 microns, and the drop-on-demand mask 310 should at least cover a point 313 on the surface 304, which is where the optical near-field is generated.

Figure 3C:
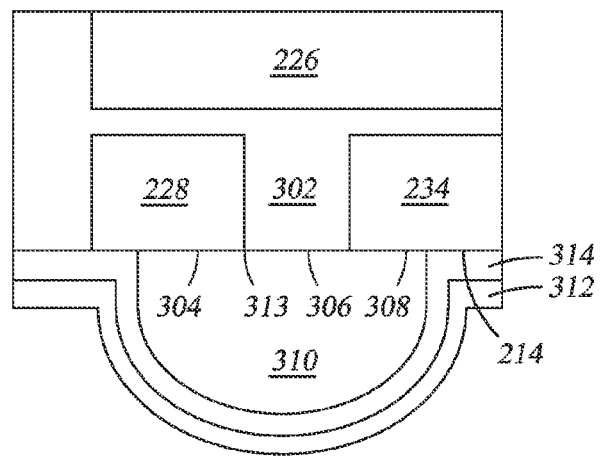
Figure 3D:
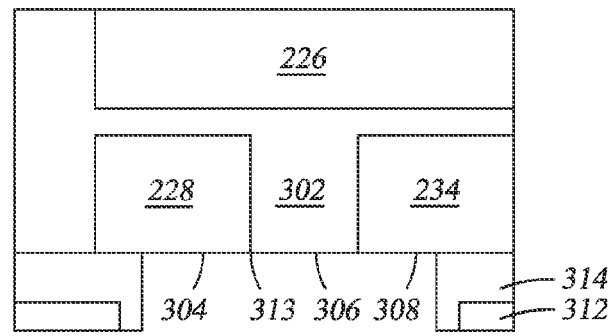

Next, as shown in FIG. 3C, a first protective layer 312 may be deposited over the remaining portion of the surface 304, the remaining portion of the surface 308, and the drop-on-demand mask 310. The first protective layer 312 may be a DLC layer deposited over the remaining portion of the surface 214 that is not covered by the drop-on-demand mask 310. An adhesion layer 314 may be deposited on and in contact with the remaining portion of the surface 214 and on and in contact with the drop-on-demand mask 310 before the first protective layer 312 is deposited, and the first protective layer 312 may be deposited on and in contact with the adhesion layer 314. The adhesion layer 314 may be a silicon layer. The total thickness of the portions of the adhesion layer 314 and the first protective layer 312 that are disposed on the drop-on-demand mask 310 is thin, such as about 5 Angstroms. The drop-on-demand mask 310 and the thin layers of the adhesion layer 314 and the first protective layer 312 disposed thereon may be removed by a wiping tool using isopropyl alcohol, as shown in FIG. 3D. Again the removal of the drop-on-demand mask 310 by the wiping tool is easier compared to the removal of a photoresist mask by an etch process, and the removal of the drop-on-demand mask 310 by the wiping tool would not damage the NFT 228. After the removal of the drop-on-demand mask 310, the portion of the surface 214, such as the portion of the surface 304 including the point 313, the surface 306, and the portion of the surface 308 that were covered by the drop-on-demand mask 310 are exposed.

Figure 3E:
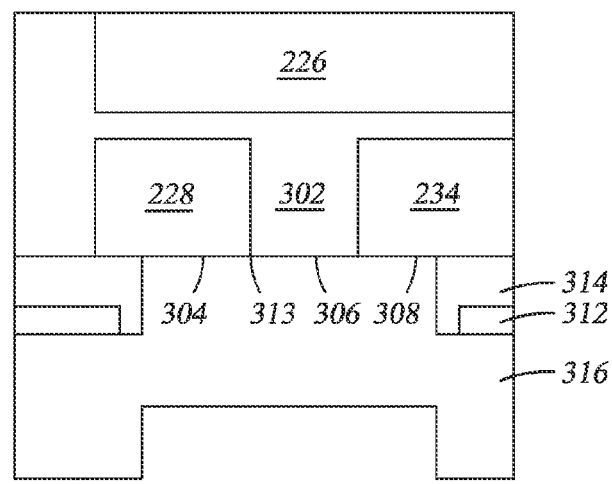
Figure 3F:
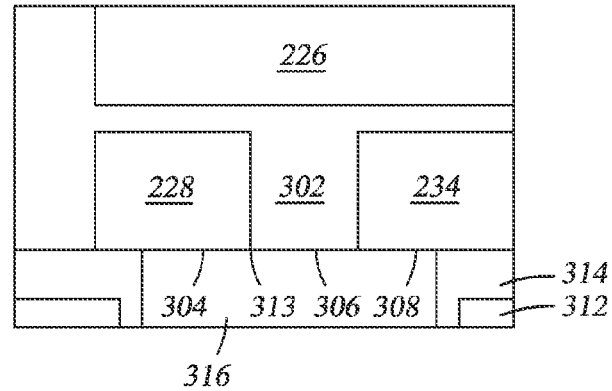

As shown in FIG. 3E, a second protective layer 316 may be deposited on the exposed portion of the surface 214, such as the portion of the surface 304 including the point 313, the surface 306, and the portion of the surface 308, and on the first protective layer 312. The second protective layer 316 may be made of optically transparent material. In some embodiments, the second protective layer 316 may have high thermal conductivity and low heat absorption, such as AN. The second protective layer 316 may be deposited by any suitable method, such as physical vapor deposition (PVD). Next, a portion of the second protective layer 316 may be removed so the first protective layer 312 and the second protective layer 316 are co-planar, as shown in FIG. 3F. The removal of the portion of the second protective layer 316 may be performed by any suitable method. In one embodiment, the removal of the portion of the second protective layer 316 is performed by lapping. In another embodiment, the removal of the portion of the second protective layer 316 is performed by a chemical mechanical polishing (CMP) process, and the first protective layer 312 serves as a stop layer for the CMP process. The first protective layer 312 and the second protective layer 316 may be the overcoat 216 shown in FIG. 2, the first protective layer 312 being the first portion 218 and the second protective layer 316 being the second portion 220. The co-planar surface of the first protective layer 312 and the second protective layer 316 may be the MFS 202 shown in FIG. 2. The second protective layer 316, which is optically transparent and has high thermal conductivity and low heat absorption, is covering the point 313.

In summary, a method for forming an overcoat on a HAMR read/write head is disclosed. The method includes depositing a drop-on-demand mask using a drop-on-demand tool. By using the drop-on-demand tool, the cost of forming a mask is reduced and the size of the mask can be easily varied. In addition, the drop-on-demand mask can be easily removed.

While the foregoing is directed to embodiments of the disclosure, other and further embodiments may be devised without departing from the basic scope thereof, and the scope thereof is determined by the claims that follow.

What is claimed is:

1. A method, comprising:
    disposing a drop-on-demand mask on at least a portion of a near field transducer;
    depositing a first protective layer over a remaining portion of the near field transducer and over the drop-on-demand mask;
    removing the drop-on-demand mask and a portion of the first protective layer disposed over the drop-on-demand mask, wherein the portion of the near field transducer is exposed; and
    depositing a second protective layer on the exposed portion of the near field transducer.

2. The method of claim 1, wherein the first protective layer comprises diamond like carbon.

3. The method of claim 1, wherein the second protective layer comprises aluminum nitride.

4. The method of claim 1, wherein the drop-on-demand mask comprises ink.

5. The method of claim 4, wherein the drop-on-demand mask is formed by a drop-on-demand tool.

6. The method of claim 1, further comprising depositing an adhesion layer on the remaining portion of the near field transducer and on the drop-on-demand mask, and the first protective layer is deposited on the adhesion layer.

7. The method of claim 6, wherein the adhesion layer comprises silicon.

8. The method of claim 7, wherein a total thickness of portions of the adhesion layer and the first protective layer disposed on the drop-on-demand mask is about 5 Angstroms.

9. The method of claim 1, wherein the drop-on-demand mask has a diameter ranging from about 1 micron to about 2 microns.

* * * * *